US006973469B1

(12) United States Patent
Hsu et al.

(10) Patent No.: US 6,973,469 B1
(45) Date of Patent: Dec. 6, 2005

(54) TWO-DIMENSIONAL DISCRETE COSINE TRANSFORM USING SIMD INSTRUCTIONS

(75) Inventors: Wei-Lien Hsu, Austin, TX (US); David Horton, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 666 days.

(21) Appl. No.: 09/776,080

(22) Filed: Feb. 1, 2001

(51) Int. Cl.7 .............................................. G06F 17/14
(52) U.S. Cl. ..................................... 708/402; 708/400
(58) Field of Search ............................... 708/400–409, 708/233; 711/170; 345/654, 561

(56) References Cited

U.S. PATENT DOCUMENTS

| | | | | |
|---|---|---|---|---|
| 4,601,006 | A | * 7/1986 | Liu | ............................ 708/401 |
| 4,821,224 | A | * 4/1989 | Liu et al. | ..................... 708/401 |
| 5,590,066 | A | 12/1996 | Ohki | |
| 5,596,517 | A | 1/1997 | Jones et al. | |
| 5,610,849 | A | 3/1997 | Huang | |
| 5,754,456 | A | 5/1998 | Eitan et al. | |
| 5,754,457 | A | * 5/1998 | Eitan et al. | ................. 708/402 |
| 5,815,421 | A | * 9/1998 | Dulong et al. | .............. 708/520 |
| 5,845,112 | A | * 12/1998 | Nguyen et al. | ............. 708/402 |
| 5,984,515 | A | 11/1999 | Mennemeier et al. | |
| 6,018,351 | A | * 1/2000 | Mennemeier et al. | ....... 345/654 |
| 6,038,580 | A | 3/2000 | Yeh | |
| 6,067,099 | A | * 5/2000 | Kabir et al. | ................. 345/561 |
| 6,141,673 | A | * 10/2000 | Thayer et al. | .............. 708/402 |
| 6,317,767 | B2 | 11/2001 | Wang | |
| 6,397,235 | B1 | 5/2002 | Van Eijndhoven et al. | |
| 6,421,696 | B1 | * 7/2002 | Horton | ....................... 708/404 |

OTHER PUBLICATIONS

Yung-Pin et al., A Cost-Effective Architecture for 8x8 Two-Dimensional DCT/IDCT Using Direct Method, 1997, IEEE Transactions on Circuits and Systems for Video Technology, vol. 7, No. 3, p. 459-467.*

Kuo-Hsing et al., The Design and Implementation of DCT/IDCT Chip with Novel Architecture, 2000, IEEE International Symposium on Circuits and Systems, pp. IV-741-IV-744.*

"Intel Architecture Software Developer's Manual, vol. 2: Instruction Set Reference", Intel Corporation, 1999.

"Enhanced3DNow!™ Technology for the AMD Athlon™ Processor," Aug. 2000, Advanced Micro Devices, Inc., pp. 1-11.

(Continued)

*Primary Examiner*—Kakali Chaki
*Assistant Examiner*—Chat Do
(74) *Attorney, Agent, or Firm*—Meyertons Hood Kivlin Kowert & Goetzel, P.C.; B. Noël Kivlin

(57) ABSTRACT

A method is disclosed for performing a discrete cosine transform (DCT) using a microprocessor having an instruction set that includes SIMD floating point instructions. In one embodiment, the method includes: (1) receiving a block of integer data having C columns and R rows; and (2) for each row, (a) loading the row data into registers; (b) converting the row data into floating point form so that the registers each hold two floating point row data values; and (c) using SIMD floating point instructions to perform weighted-rotation operations on the values in the registers. Suitable SIMD floating point instructions include the pswap, pfmul, and pfpnacc instructions. For the row-DCT, the data values are preferably ordered in the registers so as to permit the use of these instructions. For the column-DCT, two columns are preferably processed in parallel using SIMD instructions to improve computational efficiency. An intermediate buffer may be used to avoid unnecessary conversions between integer and floating point format.

16 Claims, 4 Drawing Sheets

OTHER PUBLICATIONS

"Inside 3DNow!™ Technology," ©2001 Advanced Micro Devices, Inc., pp. 1-4, http://www.amd.com/products/cpg/k623d/inside3d.html.

"3DNow!™ Technology in Microsoft DirectX 6.x," ©2001 Advanced Micro Devices, Inc. pp. 1-6, http://www.amd.com/products/cpg/3dnow/3ddirectx.html.

"3DNow!™ Fact Sheet," ©2001 Advanced Micro Devices, Inc., p. 1, http://www.amd.com/products/cpg/3dnow/factsheet.html.

"AMD3DNow!™ Frequently Asked Questions," ©2001 Advanced Micro Devices, Inc., p. 1, http://www1.amd.com/products/cpg/result/1,1265,168,00.html.

"3DNow!™ Technology Manual", ©2000 Advanced Micro Devices, Inc., pp. 1-62.

"AMD Extensions to the 3DNow!™ and MMX™ Instructions Sets Manual", ©2000 Advanced Micro Devices, Inc., pp. 1-36.

* cited by examiner

TWO-DIMENSIONAL DISCRETE COSINE TRANSFORM USING SIMD INSTRUCTIONS

BACKGROUND OF THE INVENTION

1. Field of the Invention

The present invention relates generally to systems and methods for performing discrete cosine transform (DCT) and inverse discrete cosine transform (IDCT) operations. The invention also relates to digital video compression and decompression, and more particularly to a video encoder and decoder for performing two-dimensional discrete cosine transform and/or two-dimensional inverse discrete cosine transform using single-instruction, multiple-data (SIMD) instructions to obtain improved efficiency.

2. Description of the Related Art

DSP theory provides a host of tools for the analysis and representation of signal data. The discrete cosine transform and its inverse are among the more ubiquitous of these tools in multimedia applications. The discrete cosine transform (DCT) of a discrete function $f(j)$, $j=0, 1, \ldots, N-1$ is defined as $$F(k) = \frac{2c(k)}{N} \sum_{j=0}^{N-1} f(j) \cdot \cos\left[\frac{(2j+1)k\pi}{2N}\right],$$

where $k=0, 1, \ldots, N-1$, and $$c(k) = \begin{cases} 1/\sqrt{2} & \text{for } k = 0 \\ 1 & \text{for } k \neq 0 \end{cases}.$$

The inverse discrete cosine transform (IDCT) is defined by $$f(j) = \sum_{k=0}^{N-1} c(k) F(k) \cos\left[\frac{(2j+1)k\pi}{2N}\right],$$

where $j=0, 1, \ldots, N-1$.

The discrete cosine transform may be used in a wide variety of applications and allows an arbitrary input array size. However, the straightforward DCT algorithm is often prohibitively time-consuming especially when executed on general purpose processors. In 1977, Chen et al. disclosed an efficient algorithm for performing the DCT in an article entitled "A Fast Computational Algorithm for the Discrete Cosine Transform", published in IEEE Transactions on Communications, Vol. COM-25, No. 9, September 1977, authored by Wen-Hsiung Chen, C. Harrison Smith and S. C. Fralick, which is hereby incorporated by reference. Fast DCT algorithms such as that disclosed by Chen et al. are significantly more efficient than the straightforward DCT algorithm. Nevertheless, there remains room for improvement, particularly when the algorithm is employed in specific circumstances.

Traditional x86 processors are not well adapted for the types of calculations used in signal processing. Thus, signal processing software applications on traditional x86 processors have lagged behind what was realizable on other processor architectures. There have been various attempts to improve the signal processing performance of x86-based systems. For example, microcontrollers optimized for digital signal processing computations (DSPs) have been provided on plug-in cards or the motherboard. These microcontrollers operated essentially as hardwired coprocessors enabling the system to perform signal processing functions.

As multimedia applications become more sophisticated, the demands placed on computers are redoubled. Microprocessors are now routinely provided with enhanced support for these applications. For example, many processors now support single-instruction multiple-data (SIMD) commands such as MMX instructions. Advanced Micro Devices, Inc. (hereinafter referred to as AMD) has proposed and implemented 3DNow!™, a set of floating point SIMD instructions on x86 processors starting with the AMD-K6®-2. The AMD-K6®-2 is highly optimized to execute the 3DNow!™ instructions with minimum latency. Software applications written for execution on the AMD-K6®-2 may use these instructions to accomplish signal processing functions and the traditional x86 instructions to accomplish other desired functions.

The 3DNow! instructions, being SIMD commands, are "vectored" instructions in which a single operation is performed on multiple data operands. Such instructions are very efficient for graphics and audio applications where simple operations are repeated on each sample in a stream of data. SIMD commands invoke parallel execution in superscalar microprocessors where pipelining and/or multiple execution units are provided.

Vectored instructions typically have operands that are partitioned into separate sections, each of which is independently operated upon. For example, a vectored multiply instruction may operate upon a pair of 32-bit operands, each of which is partitioned into two 16-bit sections or four 8-bit sections. Upon execution of a vectored multiply instruction, corresponding sections of each operand are independently multiplied. So, for example, the result of a vectored multiplication of [3;5] and [7;11] would be [21;55]. To quickly execute vectored multiply instructions, microprocessors such as the AMD-K6®-2 use a number of multipliers in parallel.

FIG. 1 illustrates one embodiment of a representative computer system 100 such as the AMD-K6®-2 which is configured to support the execution of general-purpose instructions and parallel floating-point instructions. Computer system 100 may comprise a microprocessor 110, memory 112, bus bridge 114, peripheral bus 116, and a plurality of peripheral devices P1–PN. Bus bridge 114 couples to microprocessor 110, memory 112 and peripheral bus 116. Bus bridge 114 mediates the exchange of data between microprocessor 110, memory 112 and peripheral devices P1–PN.

Microprocessor 110 is a superscalar microprocessor configured to execute instructions in a variable length instruction set. A subset of the variable length instruction set is the set of SIMD (simultaneous-instruction multiple-data) floating-point instructions. Microprocessor 110 is optimized to execute the SIMD floating-point instructions in a single clock cycle. In addition, the variable length instruction set includes a set of x86 instructions (e.g. the instructions defined by the 80486 processor architecture).

Memory 112 stores program instructions which control the operation of microprocessor 110. Memory 112 additionally stores input data to be operated on by microprocessor 110, and output data generated by microprocessor 110, in response to the program instructions. Peripheral devices P1–PN are representative of devices such as network interface cards (e.g. Ethernet cards), modems, sound cards, video acquisition boards, data acquisition cards, external storage media, etc. Computer system 100 may be a personal computer, a laptop computer, a portable computer, a television, a radio receiver and/or transmitter, etc.

FIG. 2 illustrates one embodiment for microprocessor 110. Microprocessor 110 may be configured with 3DNow!™ and MMX® technologies. Microprocessor 110 may comprise bus interface unit 202, predecode unit 204, instruction cache 206, decode unit 208, execution engine 210, and data cache 214. Microprocessor 110 may also include store queue 212 and an L2 cache 216. Additionally, microprocessor 110 may include a branch prediction unit and a branch resolution unit (not shown) to allow efficient speculative execution.

Predecode unit 204 may be coupled to instruction cache 206, which stores instructions received from memory 112 via bus interface unit 202 and predecode unit 204. Instruction cache 206 may also contain a predecode cache (not shown) for storing predecode information. Decode unit 208 may receive instructions and predecode information from instruction cache 206 and decode the instructions into component pieces. The component pieces may be forwarded to execution engine 210. The component pieces may be RISC operands. (Microprocessor 110 may be RISC-based superscalar microprocessor). RISC ops are fixed-format internal instructions, most of which are executable by microprocessor 110 in a single clock cycle. RISC operations may be combined to form every function of the x86 instruction set.

Execution engine 210 may execute the decoded instructions in response to the component pieces received from decode unit 208. As shown in FIG. 3, execution engine 210 may include a scheduler buffer 302 coupled to receive input from decode unit 208. Scheduler buffer 302 may be configured to convey decoded instructions to a plurality of execution pipelines 306–314 in accordance with input received from instruction control unit 304. Execution pipelines 306–314 are representative, and in other embodiments, varying numbers and kinds of pipelines may be included.

Instruction control unit 304 contains the logic necessary to manage out of order execution of instructions stored in scheduler buffer 302. Instruction control unit 304 also manages data forwarding, register renaming, simultaneous issue and retirement of RISC operations, and speculative execution. In one embodiment, scheduler buffer 302 holds up to 24 RISC operations at one time. When possible, instruction control unit 304 may simultaneously issue (from buffer 302) a RISC operation to each available execution unit.

Execution pipelines 306–315 may include load unit 306, store unit 308, X pipeline 310, Y pipeline 312, and floating point unit 314. Load unit 306 may receive input from data cache 214, while store unit 308 may interface to data cache 214 via a store queue 212. Store unit 308 and load unit 306 may be two-staged pipeline designs. Store unit 308 may perform memory writes. For a memory write operation, the store unit 308 may generate a physical address and the associated data bytes which are to be written to memory. These results (i.e. physical address and data bytes) may be entered into the store queue 212. Memory read data may be supplied by data cache 214 or by an entry in store queue 212 (in the case of a recent store).

X pipeline 310 and Y pipeline 312 may each include a combination of integer, integer SIMD (e.g. MMX®), and floating-point SIMD (e.g. 3DNow!™) execution resources. Some of these resources may be shared between the two register pipelines. As suggested by FIG. 3, load unit 306, store unit 308, and pipelines 310, 312 may be coupled to a set of registers 316 from which these units are configured to read source operands. In addition, load unit 306 and pipelines 310, 312 may be configured to store destination result values to registers 316. Registers 316 may include physical storage for a set of architected registers.

Floating point unit 314 may also include a set of floating point registers (not shown separately). Floating point unit 314 may execute floating point instructions (e.g. x87 floating point instructions, or IEEE 754/854 compliant floating point instructions) designed to accelerate the performance of scientific software. Floating point unit 314 may include an adder unit, a multiplier unit, and a divide/square-root unit, etc. Floating point unit 314 may operate in a coprocessor-like fashion, in which decode unit 208 directly dispatches the floating point instructions to unit 314. The floating point instructions may still be allocated in scheduler buffer 302 to allow for in-order retirement of instructions. Unit 314 and scheduler buffer 302 may communicate to determine when a floating point instruction is ready for retirement.

Pipelines 310, 312 include resources that allow them to perform scalar integer operations, SIMD integer operations, and SIMD floating point operations. The SIMD integer operations that are performed correspond to the MMX® instruction set architecture, and the SIMD floating point operations that are performed correspond to the 3DNow!™ instruction set. Any pair of operations which do not require a common resource may be simultaneously executed in the two pipelines (i.e. one operation per pipeline). Thus, the maximum rate of execution for the two pipelines taken together is equal to two operations per cycle.

Registers 316 may include registers which are configured to support packed integer and packed floating-point operations (e.g. registers denoted MM0 through MMn which conform to the 3DNow!™ and MMX® instruction set architectures). In one embodiment of microprocessor 110, there are eight MM registers, i.e. MM0 through MM7, each having a 64 bit storage capacity. Two 32-bit floating point operands may be loaded into each MM register in a packed format. For example, suppose register MM0 has been loaded with floating-point operands A and B, and register MM1 has been loaded with floating-point operands C and D. In shorthand notation, this situation may be represented by the expressions MM0=[A:B] and MM1=[C:D], where the first argument in a bracketed pair represents the high-order 32 bits of a quadword register, and the second argument represents the low-order 32 bits of the quadword register. The 3DNow!™ instructions invoke parallel floating-point operations on the contents of the MM registers. For example, the 3DNow!™ multiply instruction given by the assembly language construct "pfmul MM0,MM1"

invokes a parallel floating-point multiply on corresponding components of MM0 and MM1. The two floating-point resultant values of the parallel multiply are stored in register MM0. Thus, after the instruction has completed execution, register MM0 may be represented by the expression MM0=[A*C:B*D]. As used herein, the assembly language construct "pfxxx MMdest, MMsrc"

implies that a 3DNow!™ operation corresponding to the mnemonic pfxxx uses registers MMdest and MMsrc as source operands, and register MMdest as a destination operand.

The assembly language construct

"pfadd MM0,MM1"

invokes a parallel floating-point addition on corresponding components of registers MM0 and MM1. Thus, after this instructions has completed execution, register MM0 may be represented by the expression MM0=[A+C:B+D].

It is noted that alternate embodiments of microprocessor 110 are contemplated where the storage capacity of an MM register allows for more than two floating-point operands. For example, an embodiment of microprocessor 110 is contemplated where the MM registers are configured to store four 32-bit floating-point operands. In this case, the MM registers may have a size of 128-bits.

Multimedia applications demand increasing amounts of storage and transmission bandwidth. Thus, multimedia systems use various types of audio/visual compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the two-dimensional discrete cosine transform (2D-DCT). The frequency domain characteristics of a picture frame generally allow for easy removal of spatial redundancy and efficient encoding of the frame. One video data compression standard for still graphic images is JPEG (Joint Photographic Experts Group) compression. JPEG compression is actually a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. The difference frames are further compressed by such techniques as the 2D-DCT. Examples of video compression which use an interframe compression technique are MPEG (Moving Pictures Experts Group), DVI and Indeo, among others.

MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the 2D-DCT. After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). This relative encoding is achieved by the process of motion estimation. The difference image as a result of motion compensation is further compressed by means of the 2D-DCT, quantization and RLE entropy coding.

When an MPEG decoder receives an encoded stream, the MPEG decoder reverses the above operations. Thus the MPEG decoder performs inverse scanning to remove the zig zag ordering, inverse quantization to de-quantize the data, and the inverse 2D-DCT to convert the data from the frequency domain back to the pixel domain. The MPEG decoder also performs motion compensation using the transmitted motion vectors to re-create the temporally compressed frames.

Computation of the 2D-DCT as well as computation of the two-dimensional inverse discrete cosine transform (2D-IDCT) in multimedia systems generally require a large amount of processing. For example, hundreds of multiplication (or division) operations as well as hundreds of addition (or subtraction) operations may be required to perform the 2D-DCT or IDCT upon a single 8×8 array. Such computational requirements can be extremely time-consuming and resource intensive when hundred of thousands of 8×8 blocks are processed every second.

A new system and method are desired for efficiently computing the forward and/or inverse discrete cosine transform. It is particularly desirable to provide a system for computing the two-dimensional forward and/or inverse discrete cosine transform which reduces computational requirements in a general purpose computer system.

SUMMARY OF THE INVENTION

The problems discussed above are in large part addressed by a method of performing a discrete cosine transform (DCT) using a microprocessor having an instruction set that includes SIMD floating point instructions. In one embodiment, the method includes: (1) receiving a block of integer data; and (2) for each row, (a) loading the row data into registers; (b) converting the row data into floating point form so that the registers each hold two floating point row data values; and (c) using SIMD floating point instructions to perform weighted-rotation operations on the values in the registers. Suitable SIMD floating point instructions include the pswap, pfmul, and pfpnacc instructions. For the row-DCT, the data values are preferably ordered in the registers so as to permit the use of these instructions. For the column-DCT, two columns are preferably processed in parallel using SIMD instructions to improve computational efficiency. An intermediate buffer may be used to avoid unnecessary conversions between integer and floating point format.

BRIEF DESCRIPTION OF THE DRAWINGS

A better understanding of the present invention can be obtained when the following detailed description of the preferred embodiment is considered in conjunction with the following drawings, in which.

Figure 1:
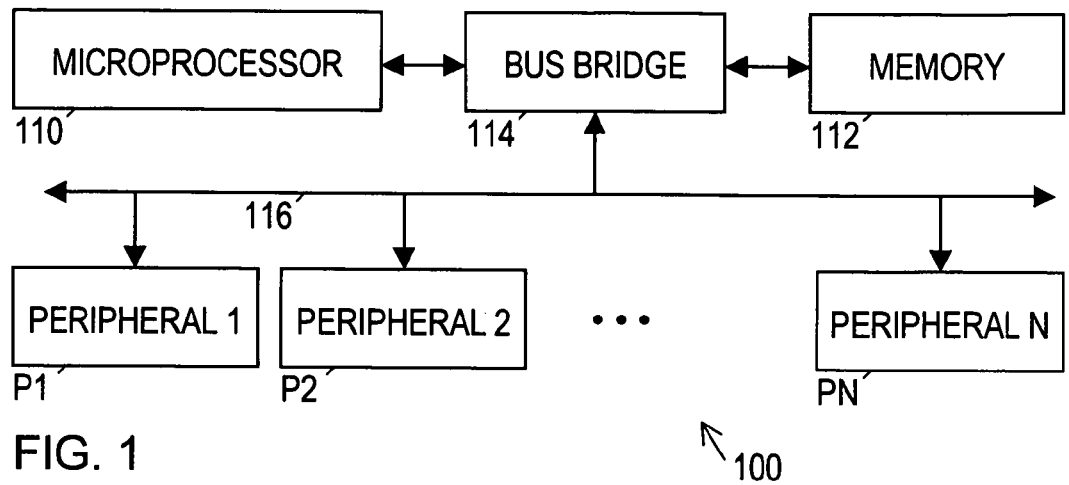
FIG. 1 shows one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

TERMINOLOGY

As used herein, the term multimedia instruction refers to the above described packed integer operations (e.g. operations such as those defined by the MMX instructions within the x86 instruction set) and to packed floating point operations optimized for three dimensional graphics calculations and/or physics calculations (e.g. operations such as those defined by the 3DNow! instructions). These instructions may be defined to operate, for example, on two 32-bit floating point numbers packed into a given multimedia register. Other packed floating point formats may be used as well.

DETAILED DESCRIPTION OF PREFERRED EMBODIMENTS

The DCT and IDCT transforms discussed in the background can be extended to two dimensions. This may be done, for example, on a flat image to identify the spatial frequency components of the image. Typically, the image is expressed in terms of small picture elements, termed pixels, laid out in a rectangular grid and each assigned a single color value. (The color value may be expressed in terms of multiple components such as Red, Green and Blue intensities, but this is easily accounted for by repeating the process disclosed below for each component). To minimize hardware requirements, the image is generally divided into small, square blocks of pixels (e.g. 8x8 pixels forms a block), termed macroblocks, and the two-dimensional transforms are applied to each block separately.

Figure 5:
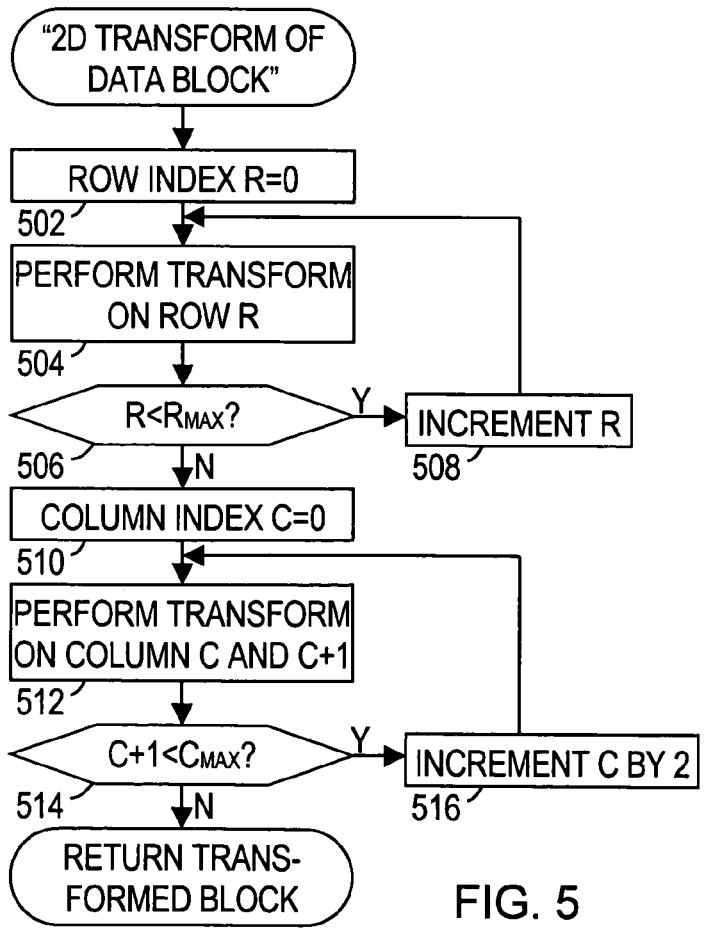
FIG. 5 shows a flowchart of a two dimensional transform.

Since the DCT and IDCT transforms are linear, when they are extended to two dimensions the horizontal and vertical transforms can be performed independently and in any order. FIG. 5 shows a flowchart of one method for performing any linear transform in two dimensions. In the ensuing discussion, the method is applied to a two-dimensional block of data having $R_{max}+1$ rows and $C_{max}+1$ columns (i.e. the row indices range from 0 to $R_{max}$, and the column indices range from 0 to $C_{max}$). This method will be described with references to FIGS. 4A–4B, where the configuration of data is shown at various points in the flowchart. For clarity in these figures, the number of rows and columns are assumed to equal eight, but other values are also contemplated.

It is contemplated that the method of FIG. 5 may take the form of a subroutine. When this subroutine is called, it would be provided with an input block of data 402 such as that shown in FIG. 4A. Data block X has components $X_{RC}$, where index R indicates the row number and index C indicates the column number. In the context of the DCT and IDCT transforms, each component $X_{RC}$ is preferably a 16-bit valued integer.

In FIG. 5, row index R is initialized to 0 in block 502. Blocks 504, 506, and 508 form a loop in which one-by-one, the rows of data block X are individually transformed. In block 504, the transform is performed on the current row as determined by row index R. In block 506, the row index R is compared to $R_{max}$, the highest row index in the data block. If the last row has not yet been transformed, then in block 508 the row index R is incremented and the loop is repeated until each row has been transformed.

Figure 4A:
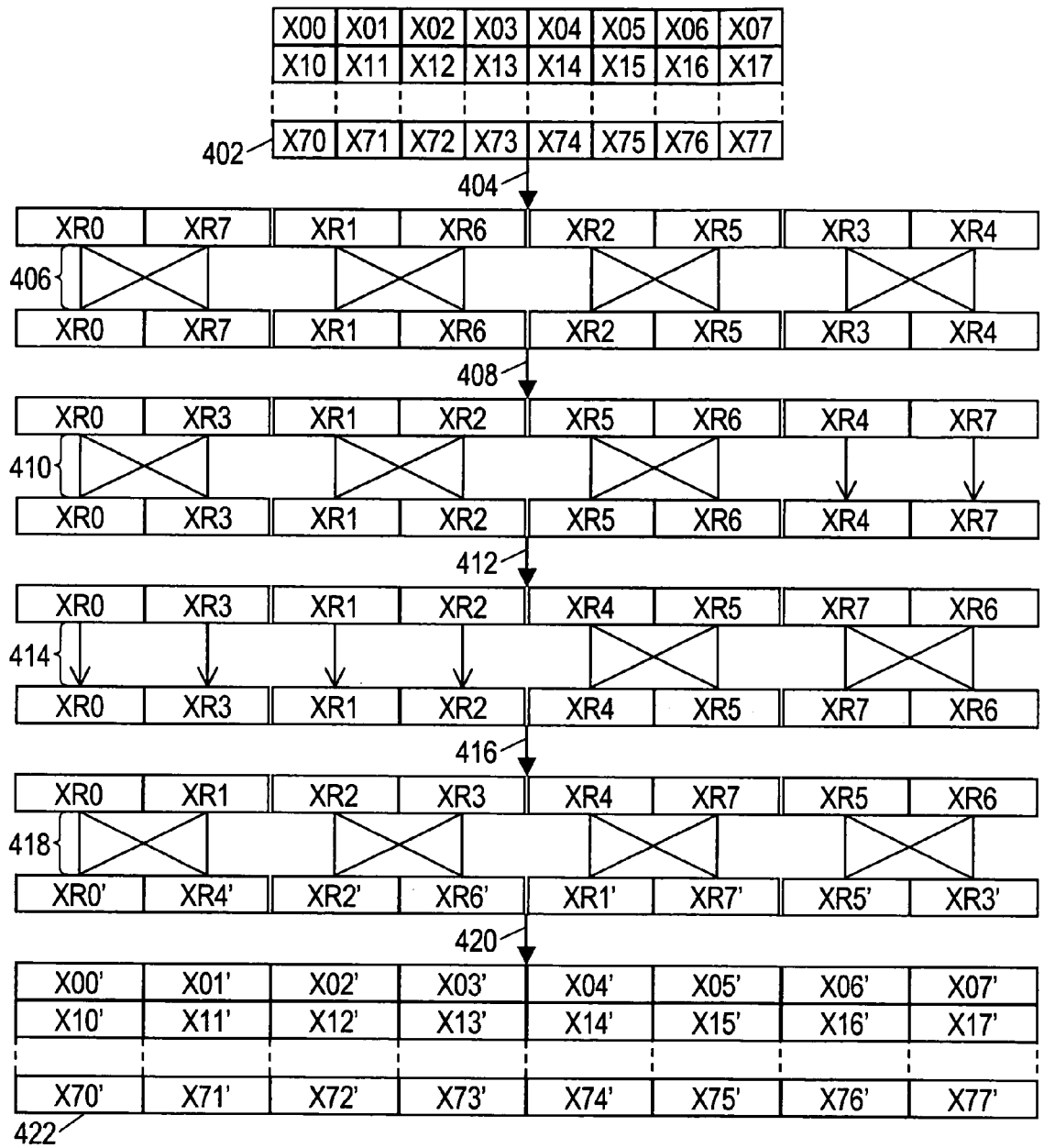
FIGS. 4A–4B show data configurations at various points in a two dimensional transform.

As part of the DCT or IDCT transform being performed in block 504, the data block components $X_{RC}$ are loaded (arrow 404 in FIG. 4A) into 64-bit processor registers and preferably converted to 32-bit floating point numbers (indicated by the expanded width of the components in FIG. 4A). It is expected that performing the transform using single-precision floating point operations will provide much greater accuracy than that obtainable using integer operations. The initial data block 402 is assumed to be packed 16-bit integers. In FIG. 4A, the register loading 404 may be accomplished as follows:

| | | |
|---|---|---|
| movq | mm0, [InpBfr] | ;put element X00 in register 0 |
| movq | mm1, [InpBfr+14] | ;put element X07 in register 1 |
| punpckldq | mm1, mm0 | ;put element X00&07 into reg 1 |
| pi2fw | mm1, mm1 | ;convert X00&07 to floating pt |
| movq | mm0, [InpBfr+2] | ;put element X01 in register 0 |
| movq | mm2, [InpBfr+12] | ;put element X06 in register 2 |
| punpckldq | mm2, mm0 | ;put element X01&06 into reg 2 |
| pi2fw | mm2, mm2 | ;convert X01&06 to floating pt |
| movq | mm0, [InpBfr+4] | ;put element X02 in register 0 |
| movq | mm3, [InpBfr+10] | ;put element X05 in register 3 |
| punpckldq | mm3, mm0 | ;put element X02&05 into reg 3 |
| pi2fw | mm3, mm3 | ;convert X02&05 to floating pt |
| movq | mm0, [InpBfr+6] | ;put element X03 in register 0 |
| movq | mm4, [InpBfr+8] | ;put element X04 in register 4 |
| punpckldq | mm4, mm0 | ;put element X03&04 into reg 4 |
| pi2fw | mm4, mm4 | ;convert X03&04 to floating pt |

In words, the integer values are separately loaded into individual registers, then pairs of integer values are formed in each register, and finally the integer values are converted to 32-bit floating point values. This requires no more than an average of two operations per value.

Figure 6:
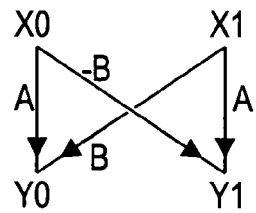
FIG. 6 shows a weighted rotation computation.

After the initial conversion to 32-bits, the transform is carried out in four stages, each stage consisting of multiple pair-wise weighted rotations followed by reordering of the register values. In FIG. 4A, the weighted rotations are shown as "butterflys". Referring momentarily to FIG. 6, a weighted rotation is an operation on two values X0, X1 to produce two new values Y0, Y1 according to the relationship:

$$Y0 = A*X0 + B*X1$$

$$Y1 = -B*X0 + A*X1$$

Returning to FIG. 4A, the first stage's four weighted rotations 406 may each be performed as follows:

| | | |
|---|---|---|
| movq | mm5, Const_W0_W7 | ;put B&A coefficients in reg 5 |
| ... | ... | ;intervening instruction(s) to allow for load latency |
| pswap | mm0, mm1 | ;put elements X07&00 in reg 0 |
| pfmul | mm1, mm5 | ;mm1=[B*X0;A*X1] |
| pfmul | mm0, mm5 | ;mm0=[B*X1;A*X0] |
| pfpnacc | mm1, mm0 | ;mm1=[A*X0+B*X1;−B*X0+A*X1] |

In words, the coefficients are loaded into a register, and while that is happening a copy of the floating point values is made into a second register with the order of the values reversed. The original and reversed values are then vector multiplied by the coefficients, and then accumulated by the pfpnacc operation. This operation causes the high end of the destination register to be subtracted from the low end of the destination register, and stores the sum of the high and low end of the source register into the high end of the destination register. Note that the movq instruction may be performed before the pfpnacc instruction of the previous weighted rotation, so that the load latency effect is minimized.

The reordering indicated by arrow 408 can then be performed as follows:

| | | |
|---|---|---|
| movq | mm0, mm4 | ;put element X03&04 in reg 0 |
| punpckhdq | mm4, mm1 | ;put element X00&03 in reg 4 |
| punpckldq | mm1, mm0 | ;put element X04&07 in reg 1 |
| movq | mm0, mm3 | ;put element X02&05 in reg 0 |
| punpckhdq | mm3, mm2 | ;put element X01&02 in reg 3 |
| punpckldq | mm2, mm0 | ;put element X05&06 in reg 2 |

This completes the first stage of FIG. 4A. The weighted rotations 410, 414, and 418 are similarly performed, as are the reorderings 412 and 416. As reordering 420 is performed, the row-transform components, denoted $X_{RC}'$, are written to an intermediate buffer 422 (TmpBfr). Block 504 of FIG. 5 includes steps 404–420, and accordingly, these steps are repeated for each row of the input block.

Returning to FIG. 5, after all the rows have been transformed, column index C is initialized to 0 in block 510. Blocks 512, 514, and 516 form a second loop in which the columns of the intermediate result buffer are transformed two at a time. In block 512, the transform is performed on the current two columns as indicated by the column index C and C+1. In block 514, the column index C+1 is compared to $C_{max}$, the largest column index in the data block. If the last column has not yet been transformed, then in block 516 the column index is incremented and the loop is repeated until each column has been transformed.

When the transform in block 512 is the subject DCT or IDCT transform, the operations are preferably performed using floating point operations. To this end, the intermediate result buffer 422 shown in FIGS. 4A and 4B preferably stores the row-transform components $X_{RC}'$ in floating point form to avoid extra conversions between integer and floating point form. As the row-transform components are loaded into processor registers two columns at a time, no conversion is necessary.

Figure 4B:
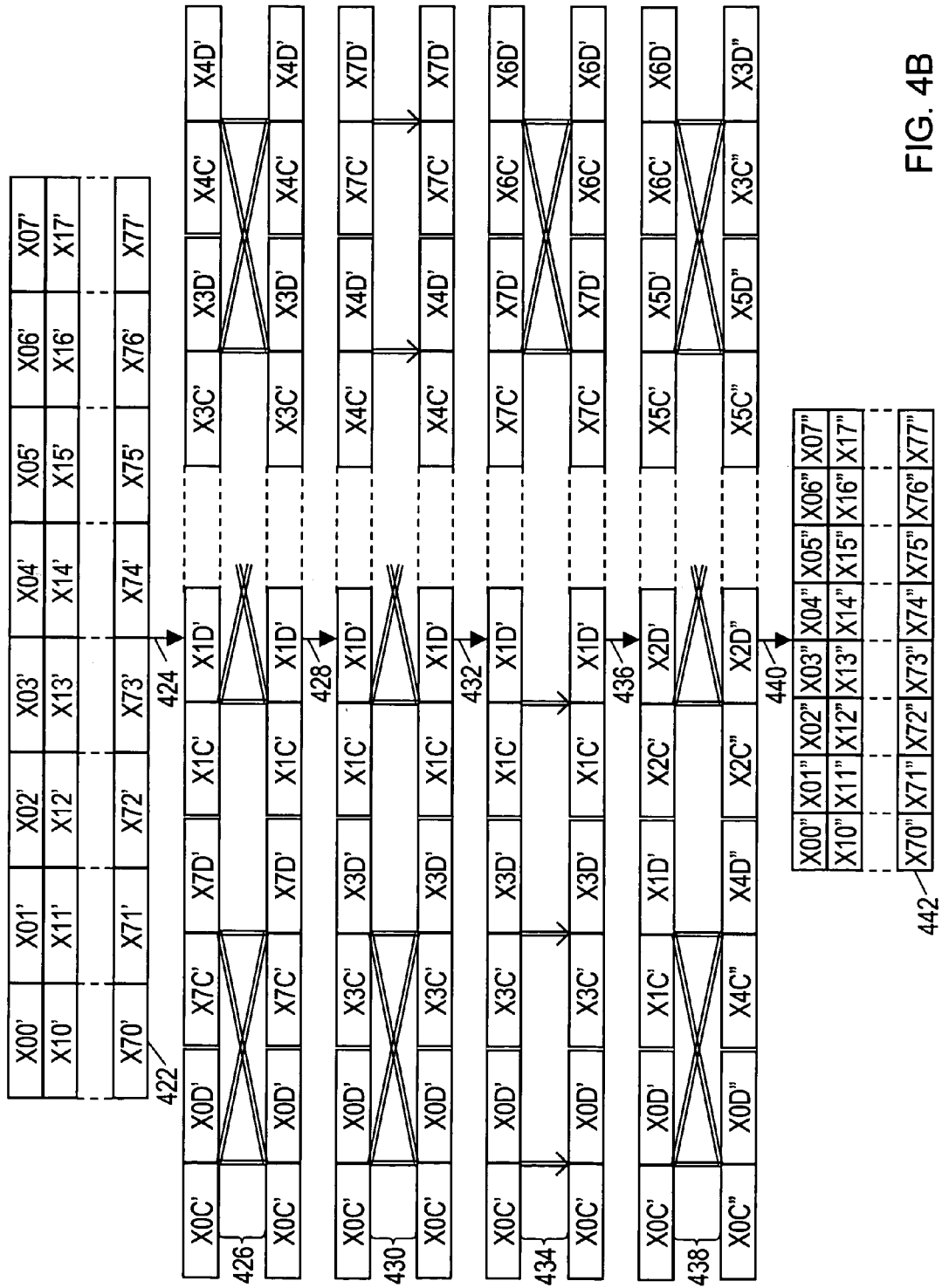

The column transform block 512 includes steps 424–440 shown in FIG. 4B. Loading step 424 can be performed as follows:

| | | |
|---|---|---|
| movq | mm2, [TmpBfr] | ;put element X01&00 in reg 2 |
| movq | mm3, [TmpBfr+112] | ;put element X71&70 in reg 3 |

Unfortunately there are not enough registers for all the values to be loaded simulatneously. Consequently, the ordering 424 and reorderings 428, 432, 436 of the values in FIG. 4B are not reflected in the arrangement of values in the registers. Load operations for the weighted rotation instructions will retrieve the values as necessary.

The first stage's four weighted rotations 426 may each be performed as follows (the load step 424 is included):

| | | |
|---|---|---|
| movq | mm0, Const_W0_W0 | ;put A coefficients in reg 0 |
| movq | mm1, Const_W7_W7 | ;put B coefficients in reg 1 |
| movq | mm2, [TmpBfr] | ;put element X01&00 in reg 2 |
| movq | mm3, [TmpBfr+112] | ;put element X71&70 in reg 3 |
| movq | mm4, mm0 | ;copy [A;A] to reg 4 |
| pfmul | mm4, mm2 | ;mm4=[A*X01;A*X00] |
| pfmul | mm0, mm3 | ;mm0=[A*X71;A*X70] |
| pfmul | mm2, mm1 | ;mm2=[B*X01;B*X00] |
| pfmul | mm3, mm1 | ;mm3=[B*X71;B*X70] |
| pfsub | mm2, mm0 | ;mm2=[A*X71−B*X01;A*X70−B*X00] |
| pfadd | mm4, mm3 | ;mm4=[A*X01+B*X71;A*X00+B*X70] |
| movq | [TmpBfr+112], mm2 | ;store rotated values in |
| movq | [TmpBfr], mm4 | ;  intermediate buffer |

In words, the coefficients are loaded, as are the values to be processed in the weighted rotation. Values from two columns are being processed in parallel by the multiplication, addition, and subtraction operations, and the results are returned to the intermediate buffer.

This completes the first stage of FIG. 4B. The weighted rotations 430, 434 and 438 are similarly performed. As the weighted rotations 438 are performed, the column transform components are converted to 16-bit integer form and written 440 to output buffer 442. This may be accomplished in the following manner:

| | | |
|---|---|---|
| pf2id | mm1, mm1 | ;convert mm1 Hi&Lo to integers |
| movd | eax, mm1 | ;copy mm1 Lo to temp register |
| mov word ptr [OutBfr],ax | | ;write integer to output bfr |
| psrlq | mm1, 32 | ;move mm1H to low end of reg |
| movd | eax, mm1 | ;copy mm1Lo temp register |
| mov word ptr [OutBfr+2],ax | | ;write integer to output bfr |

In words, the contents of the mm1 register are converted to integers. The low end of the mm1 register is then copied to a temporary register and the least significant 16 bits are then written to the output buffer. The high end of the mm1 register is then moved to the low end and the process is repeated.

Block 512 of FIG. 5 includes steps 424–440, and accordingly, these steps are repeated for each adjacent pair of columns. After the column transform is complete, the output buffer contains the now-two-dimensional transform components $X_{RC}''$ in 16-bit integer form. The contents of this buffer are returned from the subroutine.

It is noted that several variations to the method of FIG. 5 are contemplated. For example, the column transforms may be performed before the row transforms. The rows may be transformed in any order, as may the column pairs. The intermediate result buffer may be written in column order and accessed in row order rather than written in row order and accessed in column order. The description of FIG. 5 is not intended to exclude such variations.

Figure 2:
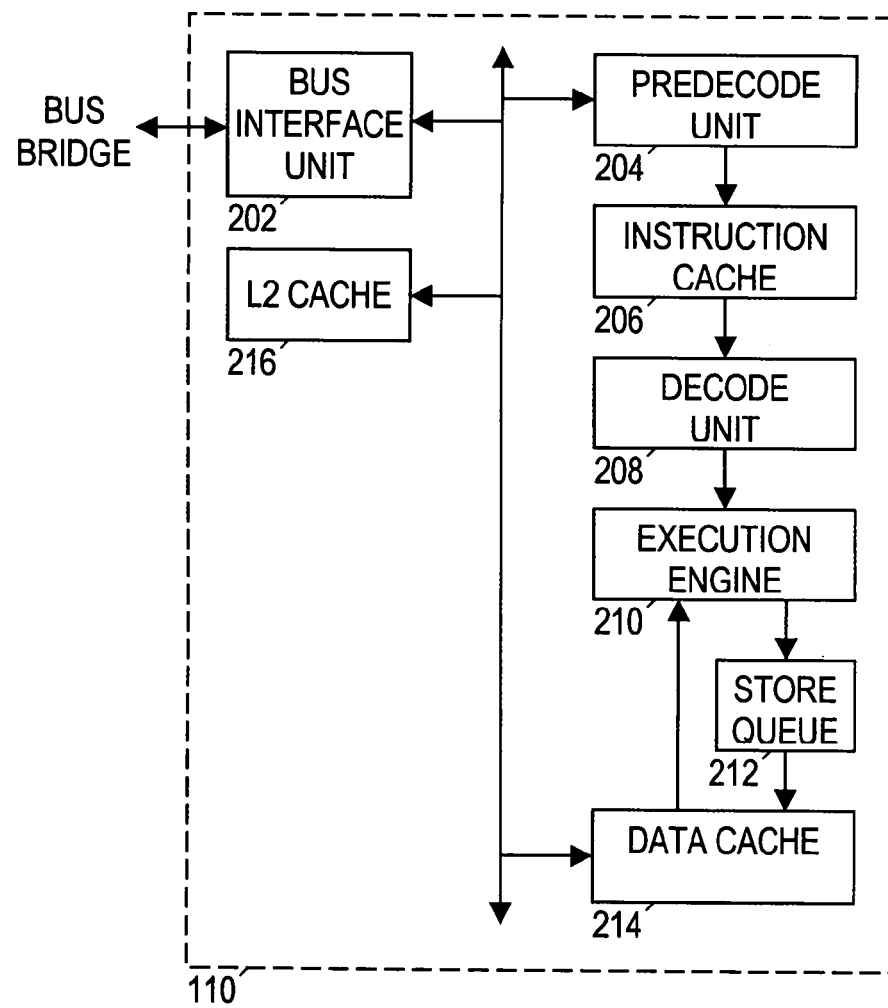
FIG. 2 shows one embodiment of a microprocessor.
Figure 3:
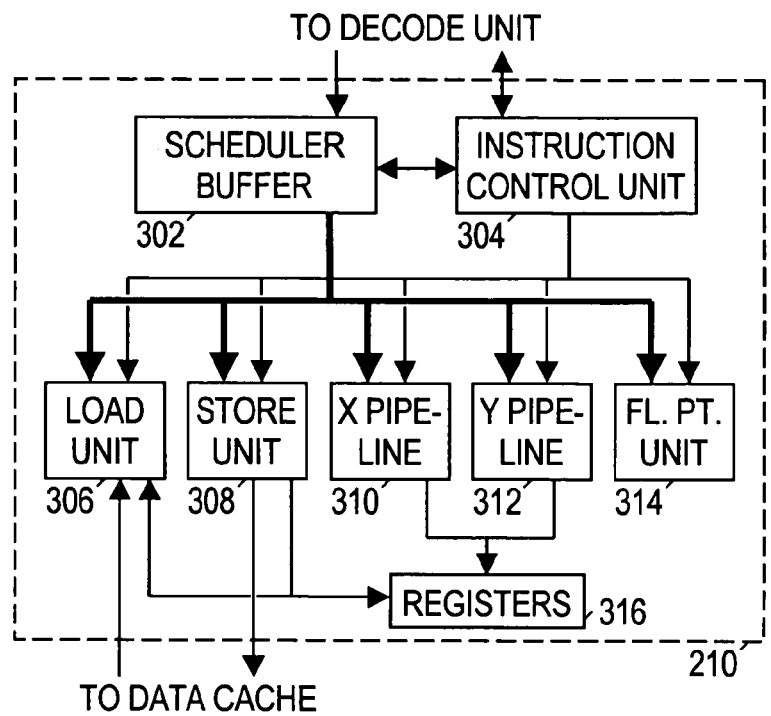
FIG. 3 shows one embodiment of an execution engine within a microprocessor.

It is further noted that the transform methods described herein may be performed by a computer system as shown in FIGS. 1–3 or a variant thereof. Specifically, the methods may be implemented in software stored in memory 112 and executed by microprocessor 110 to process multimedia data for presentation of images via a display or sound via a speaker. The transform methods described herein may be used to transform data indicative of images or sounds into a form more suitable for storage and transmission.

In various embodiments, the transform methods described in conjunction with FIGS. 4A–6 may be embodied by software instructions received, sent or stored upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The following listing presents a subroutine for a two-dimensional DCT transform on 8×8 blocks of 16-bit-valued pixels, and a subroutine for the inverse two-dimensional DCT transform. These programs use the parallel computation methods described herein that advantageously exploit the structure and instruction set of modern processors to achieve a significantly improved performance.

These subroutines use various instructions that are described in greater detail in AMD's "3DNow! Technology Manual" and AMD's "AMD Extensions to the 3DNow! and MMX Instruction Sets Manual", both of which are incorporated herein by reference.

```
static const __int64 __3dnConst_W6_W2=0x3e43ef143eec8360;
static const __int64 __3dnConst_W1_W7=0x3efb14bd3dc7c5c7;
static const __int64 __3dnConst_W5_W3=0x3e8e39d93ed4db31;
static const __int64 __3dnConst_W4_W4=0x3eb504f43eb504f4;
static const __int64 __3dnConst_W2_W6=0x3eec83603e43ef14;
static const __int64 __3dnConst_W0_W0=0x3f3504f43f3504f4;
int F3DNowDct_K7(short *inbuf, short *outbuf, int inbuf_width)
{
    float tmpbuf[64];
    register short *inptr, *outptr ;
    register float *tmpptr;
    /* Horizontal transform */
    tmpptr = tmpbuf;
    inptr = inbuf;
    outptr = outbuf;
    inbuf_width <<= 1; // short
    _asm{
            mov             ebx,    inbuf;
            mov             edx,    tmpptr;
            mov             ecx,    8
            mov             eax,    inbuf_width
;;;;;;;;;;;;;;; Horizontal DCT
_horizontal_dct_loop:
            movq            mm0,    QWORD PTR [ebx]    ; mm0=[w3:w2:w1:w0]
            movq            mm1,    QWORD PTR [ebx+8]  ; mm1=[w7:w6:w5:w4]
;;;      First Stage
/*
    b0 = (float)*(blockptr+7)+(float)*blockptr;
    b7 = (float)*blockptr-(float)*(blockptr+7);
    b1 = (float)*(blockptr+1)+(float)*(blockptr+6);
    b6 = (float)*(blockptr+1)-(float)*(blockptr+6);
    b2 = (float)*(blockptr+2)+(float)*(blockptr+5);
    b5 = (float)*(blockptr+2)-(float)*(blockptr+5);
    b3 = (float)*(blockptr+3)+(float)*(blockptr+4);
    b4 = (float)*(blockptr+3)-(float)*(blockptr+4);
*/
            pswapd          mm2, mm0                ; mm2=[w1:w0:w3:w2]
            pswapd          mm4, mm1                ; mm4=[w5:w4:w7:w6]
            punpckhdq       mm2, mm1                ; mm2=[w7:w6:w1:w0]
            punpckhdq       mm4, mm0                ; mm4=[w3:w2:w5:w4]
            pshufw          mm2, mm2, 0xb4          ; mm2=[w6:w7:w1:w0]
            pshufw          mm4, mm4, 0x1e          ; mm2=[w4:w5:w3:w2]
            movq            mm3, mm2
            movq            mm5, mm4
            pi2fw           mm2, mm2                ; mm2=[FW7:FW0]
            pi2fw           mm4, mm4                ; mm4=[FW5:FW2]
            psrlq           mm3, 16                 ; mm3=[0:w6:w7:w1]
            psrlq           mm5, 16                 ; mm5=[0:w4:w5:w3]
            pi2fw           mm3, mm3                ; mm3=[FW6:FW1]
            pi2fw           mm5, mm5                ; mm5=[FW4:FW3]
            pfpnacc         mm2, mm2                ; mm2=[FW0+FW7:FW0-FW7]=[D0:D7]
            pfpnacc         mm4, mm4                ; mm4=[FW2+FW5:FW2-FW5]=[D2:D5]
            pfpnacc         mm3, mm3                ; mm3=[FW1+FW6:FW1-FW6]=[D1:D6]
            pfpnacc         mm5, mm5                ; mm5=[FW3+FW4:FW3-FW4]=[D3:D4]
```

-continued

```
;;;     Second Stage
/*
        b[0] = b1[0] + b1[3];       b[3] = b1[0] - b1[3];
        b[1] = b1[1] + b1[2];       b[2] = b1[1] - b1[2];
        d[i] [0] = (b[0] + b[1])*f4;    d[i] [4] = (b[0] - b[1])*f4;
        d[i] [2] = b[2]*f6 + b[3]*f2;   d[i] [6] = b[3]*f6 - b[2]*f2;
*/
        movq        mm0, mm2
        punpckhdq   mm0, mm5                    ; mm0=[D3:D0]
        movq        mm1, mm4
        punpckhdq   mm1, mm3                    ; mm1=[D2:D1]
        pfpnacc     mm0, mm0                    ; mm0=[D0+D3:D0-D3]=[b0:b3]
        pfpnacc     mm1, mm1                    ; mm1=[D1+D2:D1-D2]=[b1:b2]
        movq        mm7, mm0
        punpckhdq   mm7, mm1                    ; mm7=[b1:b0]
        movq        mm6, __3dnConst_W4_W4
        pfpnacc     mm7, mm7                    ; mm7=[b0+b1:b0-b1]
        pfmul       mm7, mm6                    ; [R0:R4]=mm7=[b0+b1:b0-b1]*f7
        punpckldq   mm1, mm0                    ; mm1=[b3:b2]
        pswapd      mm0, mm1                    ; mm0=[b2:b3]
        movq        mm6, __3dnConst_W6_W2
        pfmul       mm1, mm6                    ; mm1=[b3*f6:b2*f2]
        pfmul       mm0, mm6                    ; mm0=[b2*f6:b3*f2]
        pfpnacc     mm0, mm1                    ; [R2:R6]=mm1=[b3*f6+b2*f2:b3*f6-b2*f2]
        pswapd      mm1, mm0
;;;     Third Stage
/*
        b[4] = b1[4];   b[7] = b1[7];
        b[5] = (b1[6] - b1[5]) * f0; b[6] = (b1[6] + b1[5]) * f0;
*/
        movq        mm6, __3dnConst_W0_W0
        punpckldq   mm3, mm4                    ; mm3=[D5:D6]
        pfpnacc     mm3,   mm3                  ; mm3=[D6+D5:D6-D5]=[b6:b5]
        pfmul       mm3, mm6                    ; *f0
/*
        b1[4] = b[4] + b[5];    b1[5] = b[4] - b[5];
        b1[7] = b[7] + b[6];    b1[6] = b[7] - b[6];
*/
        punpckldq   mm5, mm3                    ; mm5=[b5:D4]
        pswapd      mm3, mm3                    ; mm3=[b5:b6]
        punpckldq   mm2, mm3                    ; mm2=[b6:D7]
        pfpnacc     mm2, mm2                    ; mm2=[D7+D6:D7-D6]=[b17:b16]
        movq        mm3, mm5                    ; redundant
        pfpnacc     mm3, mm3                    ; mm3=[D4+D5:D4-D5]=[b14:b15]
/*
        d[i] [1] = b1[4]*f7 + b1[7]*f1;   d[i] [3] = b1[6]*f3 - b1[5]*f5;
        d[i] [5] = b1[5]*f3 + b1[6]*f5;   d[i] [7] = b1[7]*f7 - b1[4]*f1;
*/
        movq        mm6, __3dnConst_W1_W7
        movq        mm4, mm2
        punpckhdq   mm2, mm3                    ; mm2=[b14:b17]
        punpckldq   mm4, mm3                    ; mm4=[b16:b15]
        pswapd      mm3, mm2                    ; mm3=[b17:b14]
        pswapd      mm5, mm4                    ; mm5=[b15:b16]
        pfmul       mm2, mm6                    ; mm2=[b4*f1:b7*f7]
        pfmul       mm3, mm6                    ; mm3=[b7*f1:b4*f7]
        movq        mm0, __3dnConst_W5_W3
        pfpnacc     mm2, mm3                    ; [R1:R7]=mm2=[b4*f7+b7*f1:b7*f7-b4*f1]
        pfmul       mm4, mm0                    ; mm4=[b6*f5:b5*f3]
        pfmul       mm5, mm0                    ; mm5=[b5*f5:b6*f3]
        pfpnacc     mm4, mm5                    ; [R5:R3]=mm4=[b6*f5+b5*f3:b6*f3-b5*f5]
;;;     Final Stage
        movq        mm0, mm7                    ; [R0;R4]
        pswapd      mm4, mm4                    ; mm4=[R3:b5]
        movq        mm3, mm1                    ; [R2;R6]
        punpckhdq   mm7, mm2                    ; mm7=[R1:R0]
        punpckhdq   mm3, mm4                    ; mm3=[R3:R2]
        punpckldq   mm0, mm4                    ; mm3=[R5:R4]
        punpckldq   mm1, mm2                    ; mm3=[R7:R6]
        movntq      QWORD PTR [edx],        mm7
        movntq      QWORD PTR [edx + 8],    mm3
        movntq      QWORD PTR [edx + 16],   mm0
        movntq      QWORD PTR [edx + 24],   mm1
        add         edx, 32
        add         ebx, eax
        dec         ecx
        jnz         __horizontal_dct_loop       ; LOOP
;;;;;;;;;;;;; Vertical DCT
        mov         ebx, tmpptr;
```

-continued

```
            mov         edx,    outptr;
            mov         ecx,    8
__vertical__dct__loop:
;;;     First Stage
/*
    b0 = (float)*(blockptr+7)+(float)*blockptr;
    b7 = (float)*blockptr−(float)*(blockptr+7);
    b1 = (float)*(blockptr+1)+(float)*(blockptr+6);
    b6 = (float)*(blockptr+1)−(float)*(blockptr+6);
    b2 = (float)*(blockptr+2)+(float)*(blockptr+5);
    b5 = (float)*(blockptr+2)−(float)*(blockptr+5);
    b3 = (float)*(blockptr+3)+(float)*(blockptr+4);
    b4 = (float)*(blockptr+3)−(float)*(blockptr+4);
*/
            movq        mm2, DWORD PTR [ebx]            ; mm5=[xxx:FW0]
            punpckldq   mm2, QWORD PTR [ebx+56*4]       ; mm5=[FW7:FW0]
            movq        mm3, DWORD PTR [ebx+8*4]        ; mm5=[xxx:FW1]
            punpckldq   mm3, QWORD PTR [ebx+48*4]       ; mm5=[FW6:FW1]
            movq        mm4, DWORD PTR [ebx+16*4]       ; mm5=[xxx:FW2]
            punpckldq   mm4, QWORD PTR [ebx+40*4]       ; mm5=[FW5:FW2]
            movq        mm5, DWORD PTR [ebx+24*4]       ; mm5=[xxx:FW3]
            punpckldq   mm5, QWORD PTR [ebx+32*4]       ; mm5=[FW4:FW3]
            pfpnacc     mm2, mm2                        ; mm2=[FW0+FW7:FW0−FW7]=[D0:D7]
            pfpnacc     mm4, mm4                        ; mm4=[FW2+FW5:FW2−FW5]=[D2:D5]
            pfpnacc     mm3, mm3                        ; mm3=[FW1+FW6:FW1−FW6]=[D1:D6]
            pfpnacc     mm5, mm5                        ; mm5=[FW3+FW4:FW3−FW4]=[D3:D4]
;;;     Second Stage
/*
    b[0] = b1[0] + b1[3];   b[3] = b1[0] − b1[3];
    b[1] = b1[1] + b1[2];   b[2] = b1[1] − b1[2];
    d[i] [0] = (b[0] + b[1])*f4;   d[i] [4] = (b[0] − b[1])*f4;
    d[i] [2] = b[2]*f6 + b[3]*f2;  d[i] [6] = b[3]*f6 − b[2]*f2;
*/
            movq        mm0, mm2
            punpckhdq   mm0, mm5                        ; mm0=[D3:D0]
            movq        mm1, mm4
            punpckhdq   mm1, mm3                        ; mm1=[D2:D1]
            pfpnacc     mm0, mm0                        ; mm0=[D0+D3:D0−D3]=[b0:b3]
            pfpnacc     mm1, mm1                        ; mm1=[D1+D2:D1−D2]=[b1:b2]
            movq        mm7, mm0
            punpckhdq   mm7, mm1                        ; mm7=[b1:b0]
            movq        mm6, __3dnConst_W4_W4
            pfpnacc     mm7, mm7                        ; mm7=[b0+b1:b0−b1]
            pfmul       mm7, mm6                        ; [R0:R4]=mm7=[b0+b1:b0−b1]*f7
            punpckldq   mm1, mm0                        ; mm1=[b3:b2]
            pswapd      mm0, mm1                        ; mm0=[b2:b3]
            movq        mm6, __3dnConst_W6_W2
            pfmul       mm1, mm6                        ; mm1=[b3*f6:b2*f2]
            pfmul       mm0, mm6                        ; mm0=[b2*f6:b3*f2]
            pfpnacc     mm0, mm1                        ; [R2:R6]=mm1=[b3*f6+b2*f2:b3*f6−b2*f2]
            pswapd      mm1, mm0
;;;     Third Stage
/*
    b[4] = b1[4];   b[7] = b1[7];
    b[5] = (b1[6] − b1[5]) * f0; b[6] = (b1[6] + b1[5]) * f0;
*/
            movq        mm6, __3dnConst_W0_W0
            punpckldq   mm3, mm4
            pfpnacc     mm3, mm3                        ; mm3=[D6+D5:D6−D5]=[b6:b5]
            pfmul       mm3, mm6                        ; *f0
/*
    b1[4] = b[4] + b[5];    b1[5] = b[4] − b[5];
    b1[7] = b[7] + b[6];    b1[6] = b[7] − b[6];
*/
            punpckldq   mm5, mm3                        ; mm5=[b5:D4]
            pswapd      mm3, mm3                        ; mm3=[b5:b6]
            punpckldq   mm2, mm3                        ; mm2=[b6:D7]
            pfpnacc     mm2, mm2                        ; mm2=[D7+D6:D7−D6]=[b17:b16]
            movq        mm3, mm5                        ; redundant
            pfpnacc     mm3, mm3                        ; mm3=[D4+D5:D4−D5]=[b14:b15]
/*
    d[i] [1] = b1[4]*f7 + b1[7]*f1;   d[i] [3] = b1[6]*f3 − b1[5]*f5;
    d[i] [5] = b1[5]*f3 + b1[6]*f5;   d[i] [7] = b1[7]*f7 − b1[4]*f1;
*/
            movq        mm6, __3dnConst_W1_W7
            movq        mm4, mm2
            punpckhdq   mm2, mm3                        ; mm2=[b14:b17]
            punpckldq   mm4, mm3                        ; mm4=[b16:b15]
            pswapd      mm3, mm2                        ; mm3=[b17:b14]
```

```
            pswapd      mm5, mm4                        ; mm5=[b15:b16]
            pfmul       mm2, mm6                        ; mm2=[b4*f1:b7*f7]
            pfmul       mm3, mm6                        ; mm3=[b7*f1:b4*f7]
            movq        mm0, __3dnConst_W5_W3
            pfpnacc     mm2, mm3                        ; [R1:R7]=mm2=[b4*f7+b7*f1:b7*f7−b4*f1]
            pfmul       mm4, mm0                        ; mm4=[b6*f5:b5*f3]
            pfmul       mm5, mm0                        ; mm5=[b5*f5:b6*f3]
            pfpnacc     mm4, mm5                        ; [R5:R3]=mm4=[b6*f5+b5*f3:b6*f3−b5*f5]
;;;         Final Stage
            pf2iw       mm7, mm7
            pf2iw       mm1, mm1
            pf2iw       mm4, mm4
            pf2iw       mm2, mm2
            movd        eax, mm7                        ; eax=R4, mm7=[R0;R4]
            mov         WORD PTR [edx+32*2],    ax      ; R4
            pswapd      mm6, mm7                        ; mm6=[R4;R0]
            movd        eax, mm6                        ; edx=R0, mm6=[R4;R0]
            mov         WORD PTR [edx],         ax      ; R0
            movd        eax, mm1                        ; eax=R6, mm1=[R2;R6]
            mov         WORD PTR [edx+48*2],    ax      ; R6
            pswapd      mm6, mm1                        ; mm6=[R6;R2]
            movd        eax, mm6                        ; edx=R2, mm6=[R6;R2]
            mov         WORD PTR [edx+16*2],    ax      ; R2
            movd        eax, mm4                        ; eax=R3, mm4=[R5;R3]
            mov         WORD PTR [edx+24*2],    ax      ; R3
            pswapd      mm6, mm4                        ; mm6=[R3;R5]
            movd        eax, mm6                        ; edx=R5, mm6=[R3;R5]
            mov         WORD PTR [edx+40*2],    ax      ; R5
            movd        eax, mm2                        ; eax=R7, mm2=[R1;R7]
            mov         WORD PTR [edx+56*2],    ax      ; R7
            pswapd      mm6, mm2                        ; mm6=[R7;R1]
            movd        eax, mm6                        ; edx=R1, mm6=[R7;R1]
            mov         WORD PTR [edx+8*2],     ax      ; R1
            add         edx, 2
            add         ebx, 4
            dec         ecx
            jnz         __vertical_dct_loop             ;
            femms
        }
        return 0;
}
/*****************************************************************
 *                                                                *
 *    2_dimensional Inverse Discrete Cosine Transform             *
 *                                                                *
 *****************************************************************/
static const __int64
        __3dnConst_W1_W7=0x3efb14bd3dc7c5c7,
        __3dnConst_W5_W3=0x3e8e39d93ed4db31,
        __3dnConst_W4_W4=0x3eb504f43eb504f4,
        __3dnConst_W2_W6=0x3eec83603e43ef14,
        __3dnConst_W0_W0=0x3f3504f43f3504f4;
        __MMXConst_AllZero=0x0000000000000000;
/* only one of these three versions of the vertical
transform may be selected, the others must be zero */
#define __1stVT__ 0
#define __2ndVT__ 0
#define __3rdVT__ 1
/* this variable determines whether the data is checked
to look for possibility of early termination */
/* This section needs more work before is usable*/
#define __chk_idata__ 1
int idct_3dn(short *inbuf, short *outbuf)
{
    float tmpbuf[64];
    double tmpQWord;
    /* Horizontal Transform */
    __asm {
        mov         ecx, inbuf
        lea         edx, tmpbuf
        mov         eax, 8
__idct_hloop_3dn:
        movq        mm0, QWORD PTR [ecx]                ;[b3:b2:b1:b0]
        movq        mm1, QWORD PTR [ecx + 8]            ;[b7:b6:b5:b4]
#if __chk_idata__
        movq        mm6, __MMXConst_AllZero
        movq        mm7, __MMXConst_AllZero
        psadbw      mm6, mm0
        psadbw      mm7, mm1
```

-continued

```
        punpcklwd   mm6, mm7
        movd        ebx, mm6
        test        ebx, ebx
        jnz         __good__idata
        ;have to clear this row in tempBuf
        movq        [edx], mm0
        movq        [edx + 8], mm0
        add         ecx, 16
        movq        [edx + 16], mm0
        movq        [edx + 24], mm0
        add         edx, 32
        dec         al
        jnz         __idct__hloop__3dn          ;repeat the hloop
        jmp         __idc__vtrans__setup        ;finished, go to vertical transform
__good__idata:
        or          eax, 0x800000               ;this row has an entry
#endif
        //first stage
        movq        mm7, __3dnConst__W1__W7
        pswapd      mm2, mm0
        pswapd      mm4, mm1
        punpckhdq   mm2, mm1                    ;[b7:b6:b1:b0]
        punpckhdq   mm4, mm0                    ;[b3:b2:b5:b4]
        pshufw      mm2, mm2, 0x93              ;%10010011 => [b6:b1:b0:b7]
        pshufw      mm4, mm4, 0x39              ;%00111001 => [b4:b3:b2:b5]
        pi2fw       mm2, mm2                    ;[B1:B7]
        pi2fw       mm4, mm4                    ;[B3:B5]
        pswapd      mm3, mm2                    ;[B7:B1]
        pfmul       mm2, mm7                    ;[W1*B1:W7*B7]
        pfmul       mm3, mm7                    ;[W1*B7:W7*B1]
        movq        mm5, mm0
        movq        mm7, __3dnConst__W5__W3
        pfpnacc     mm3, mm2                    ;[(W1*B1)+(W7*37):(W7*B1)-
(W1*B7)]=[x4:x5]
        punpckldq   mm5, mm1                    ;[b5:b4:b1:b0]
        pswapd      mm2, mm4                    ;[B5:B3]
        pfmul       mm4, mm7                    ;[W5*B3:W3*B5]
        pfmul       mm2, mm7                    ;[W5*B5:W3*B3]
        pi2fw       mm5, mm5                    ;[B4:B0]
        movq        mm7, __3dnConst__W4__W4
        pfpnacc     mm4, mm2                    ;[(W5*B5)+(W3*B3):(W3*B5)-
(W5*B3)]=[x6:x7]
        ;second stage
        punpckhdq   mm0, mm1                    ;[b7:b6:b3:b2]
        pfmul       mm5, mm7                    ;[W4*B4:W4*B0]
        pi2fw       mm0, mm0                    ;[B6:B2]
        movq        mm7, __3dnConst__W2__W6
        pfpnacc     mm5, mm5                    ;[(W4*B0)+(W4*B4):(W4*B0)-
(W4*B4)]=[tmp1:x0]
        pswapd      mm1, mm0                    ;[B2:B6]
        pfmul       mm0, mm7                    ;[W2*B6:W6*B2 ]
        pfmul       mm1, mm7                    ;[W2*B2:W6*B6]
        movq        mm6, mm3
        pfpnacc     mm0, mm1                    ;[(W6*B6)+(W2*B2):(W6*B2)-
(W2*B6)]=[x3:x2]
        punpckhdq   mm3, mm4
;[(W5*B5)+(W3*B3):(W1*B1)+(W7*B7)]=[x6:x4]
        punpckldq   mm6, mm4                    ;[(W3*B5)-(W5*B3):(W7*B1)-
(W1*B7)]=[x7:x5]
        pfpnacc     mm3, mm3    ;[(W5*B5)+(W3*B3)+(W1*B1)+(W7*B7):(W1*B1)+(W7*B7)-
(W5*B5)-(W3*B3)]=[(x4+x6):(x4-x6)]=[x1:x4]
        pfpnacc     mm6, mm6    ;[(W3*B5)-(W5*B3)+(W7*B1)-(W1*B7):(W7*B1)-(W1*B7)-
(W3*B5)+(W5*B3)]=[(x5+x7):(x5-7)]=[x6:tmp2]
        ;third stage
        movq        mm1, mm5
        punpckhdq   mm5, mm0
;[(W6*B6)+(W2*B2):(W4*B0)+(W4*B4)]=[x3:tmp1]
        punpckldq   mm1, mm0                    ;[(W6*B2)-(W2*B6):(W4*B0)-
(W4*B4)]=[x2:x0]
        pfpnacc     mm5, mm5    ;[(W4*B0)+(W4*B4)+(W6*B6)+(W2*B2):(W4*B0)+(W4*B4)-
(W6*B6)-(W2*B2)]=[(tmp1+x3):(tmp1-x3)]=[x7:x5]
        pfpnacc     mm1, mm1    ;[(W4*B0)-(W4*B4)+(W6*B2)-(W2*B6):(W4*B0)-(W4*B4)-
(W6*B2)+(W2*B6)]=[(x0+x2):(x0-x2)]=[x3:x0]
        movq        mm0, mm3
        movq        mm7, __3dnConst__W0__W0
        punpckldq   mm0, mm6    ;[(W7*B1)-(W1*B7)-(W3*B5)+(W5*B3):(W1*B1)+(W7*B7)-
(W5*B5)-(W3*B3)]=[tmp2:x4]
        pswapd      mm6, mm6
        pfpnacc     mm0, mm0                    ;[(x4+tmp2):(x4-tmp2)]
```

-continued

```
        punpckldq   mm6, mm5
        movq        mm2, mm1                    ;[x3:x0]
        pswapd      mm6, mm6
        pfmul       mm0, mm7                    ;[x2:x4]
;fourth stage
        pfpnacc     mm6, mm6                    ;[Tp3:Tp4]
        punpckhdq   mm5, mm3                    ;[x1:x7]
        punpckhdq   mm1, mm0                    ;[x2:x3]
        pfpnacc     mm5, mm5                    ;[Tp0:Tp7]
        punpckldq   mm2, mm0                    ;[x4:x0]
        pfpnacc     mm1, mm1                    ;[Tp1:Tp6]
        pfpnacc     mm2, mm2                    ;[Tp2:Tp5]
;use noninverted intermediate storage buffer
        movq        mm4, mm5
        punpckhdq   mm5, mm1                    ;[Tp1:Tp0]
        add         ecx, 16
        movntq      QWORD PTR [edx], mm5
        punpckldq   mm1, mm4                    ;[Tp7:Tp6]
        movq        mm4, mm2                    ;[Tp2:Tp5]
        movntq      QWORD PTR [edx + 24], mm1
        punpckhdq   mm2, mm6                    ;[Tp3:Tp2]
        punpckldq   mm6, mm4                    ;[Tp5:Tp4]
        movntq      QWORD PTR [edx + 9], mm2
        add         edx, 32
#if __chk_idata__
        dec         a1
#else
        dec         eax
#endif
        movntq      QWORD PTR [edx__16], mm6
        jnz         __idct__hloop__3dn
__idct__vtrans__setup:
        mov         ecx, outbuf
#if __chk_idata__
        test        eax, 0x800000
        jnz         __idct__3dn__vloop__cont
        movq        mm0, __MMXConst__AllZero
        mov         eax, 8
__idct__vsetup__loop:                            ;still have to write zeros to output buffer
        movq        [ecx], mm0
        movq        [ecx + 8], mm0
        add         ecx, 16
        dec         eax
        jnz         __idct__vsetup__loop
        jmp         __end__idct__3dn
#endif
__idct__3dn__vloop__cont:
        sub         edx, 32*8                   ;put edx back to start of tmpbuf
        mov         eax, 4
__idct__vloop__3dn:
        // Part #1
        movq        mm0, [edx + 8*4]            ;[C9:C8]
        movq        mm1, [edx + 56*4]           ;[C57:C56]
        movq        mm2, mm0
        punpckhdq   mm0, mm1                    ;[C57:C9]
        punpckldq   mm2, mm1                    ;[C56:C8]
        movq        mm7, __3dnConst__W1__W7
        pswapd      mm1, mm0                    ;[C9:C57]
        pswapd      mm3, mm2                    ;[C8:C56]
        pfmul       mm0, mm7                    ;[C57*W1:C9*W7]
        pfmul       mm1, mm7                    ;[C9*W1:C57*W7]
        pfmul       mm2, mm7                    ;[C56*W1:C5*W7]
        pfmul       mm3, mm7                    ;[C5*W1:C56*W7]
        pfpnacc     mm0, mm1                    ;[(C9*W1)+(C57*W7):(C9*W7)−
(C57*W1)]=[x4b:x5b]
        pfpnacc     mm2, mm3                    ;[(C8*W1)+(C56*W7):(C8*W7)−
(C56*W1)]=[x4a:x5a]
        // Part #2
        movq        mm5, [edx + 24*4]           ;[C25:C24]
        movq        mm1, [edx + 40*4]           ;[C41:C40]
        movq        mm4, mm5
        punpckhdq   mm5, mm1                    ;[C41:C25]
        punpckldq   mm4, mm1                    ;[C40:C24]
        movq        mm7, __3dnConst__W5__W3
        pswapd      mm3, mm5                    ;[C25:C41]
        pswapd      mm1, mm4                    ;[C24:C40]
        pfmul       mm5, mm7                    ;[C41*W5:C25*W3]
        pfmul       mm3, mm7                    ;[C25*W5:C41*W3]
        pfmul       mm4, mm7                    ;[C40*W5:C24*W3]
```

```
                                                   -continued
pfmul       mm1, mm7                ;[C24*W5:C40*W3]
pfpnacc     mm3, mm5                ;[(C41*W5)+(C25*W3):(C41*W3)-
(C25*W5)]=[x6b:x7b]
pfpnacc     mm1, mm4                ;[(C40*W5)+(C24*W3):(C40*W3)-
(C24*W5)]=[x6a:x7a]
    //Part #3
movq        mm4, mm2                ;[x4a:x5a]
movq        mm5, mm0                ;[x4b:x5b]
pfadd       mm0, mm3                ;[(x4b+x6b:x5b+x7b)]=[x1b':x6b']
pfsub       mm5, mm3                ;[(x4b-x6b:x5b-x7b)]=[x4b:Tmp2b]
pfsub       mm4, mm1                ;[(x4a-x6a:x5a-x7a)]=[x4a:Tmp2a]
pswapd      mm5, m5                 ;[Tmp2b:x4b]
pswapd      mm4, mm4                ;[Tmp2a:x4a]
pfadd       mm2, mm1                ;[x4a+x6a:x5a+x7a)]=[x1a':x6a']
    // Part #4
movq        mm7, __3dnConst__W0__W0
pfpnacc     mm4, mm4                ;[(x4a+Tmp2a):(x4a-Tmp2a)]
pfpnacc     mm5, mm5                ;[(x4b+Tmp2b):(x4b-Tmp2b)]
pfmul       mm4, mm7                ;[x2a':x4a']
pfmul       mm5, mm7                ;[x2b':x4b']
movq        tmpQWord, mm2
    // Part 5
movq        mm1, [edx + 16*4]       ;[C17:C16]
movq        mm3, [edx + 48*4]       ;[C49:C48]
movq        mm6, mm1
punpckhdq   mm1, mm3                ;[C49:C17]
movq        mm7, __3dnConst__W2__W6
punpckldq   mm6, mm3                ;[C48:C16]
pswapd      mm3, mm1                ;[C17:C49]
movq        tmpQWord2, mm0
pfmul       mm1, mm7                ;[C49*W2:C17*W6]
pfmul       mm3, mm7                ;[C17*W2:C49*W6]
pfpnacc     mm1, mm3                ;[C17*W2+C49*W6:C17*W6-
C49*W2]=[x3b:x2b]
pswapd      mm3, mm6                ;[C16:C48]
pfmul       mm6, mm7
pfmul       mm3, mm7
pfpnacc     mm6, mm3                ;[C16*W2+C48*W6:C16*W6-
C48*W2]=[x3a:x2a]
    // Part 6
movq        mm3, [edx]              ;[C1:C0]
movq        mm7, [edx + 32*4]       ;[C33:C32]
movq        mm2, mm3
punpckhdq   mm3, mm7                ;[C33:C1]
punpckldq   mm2, mm7                ;[C32:C0]
movq        mm7, __3dnConst__W4__W4
pfpnacc     mm3, mm3
pfpnacc     mm2, mm2
pfmul       mm3, mm7                ;[(C1+C33)*W4:(C1-C33)*W4]=[Tmp1b:x0b]
pfmul       mm2, mm7                ;[(C0+C32)*W4:(C0-C32)*W4]=[Tmp1a:x0a]
    // Parts 7 & 9
movq        mm7, mm3
pfadd       mm3, mm1                ;[Tmp1b+x3b:x0b+x2b] = [x7b':x3b']
pfsub       mm7, mm1                ;[Tmp1b-x3b:x0b-x2b] = [x5b':x0b']
movq        mm1, mm2
pfsub       mm2, mm6                ;[Tmp1a-x3a:x0a-x2a] = [x5a':x0a']
pfadd       mm1, mm6                ;[Tmp1a+x3a:x0a+x2a] = [x7a':x3a']
    // Rearrange and write out
movq        mm6, mm4                ;[x2a':x4a']
punpckldq   mm4, mm5                ;[x4b':x4a']
punpckhdq   mm6, mm5                ;[x2b':x2a']
movq        mm5, mm1
punpckhdq   mm1, mm3                ;[x7b':x7a']
punpckldq   mm5, mm3                ;[x3b':x3a']
movq        mm3, mm5
pfadd       mm5, mm6                ;[x3b'+x2b':x3a'+x2a'] = [FB9:FB5]
pfsub       mm3, mm6                ;[x3b'-x2b':x3a'-x2a'] = [FB49:FB4B]
pf2iw       mm5, mm5
pf2iw       mm3, mm3
pshufw      mm5, mm5, 0x'
pshufw      mm3, mm3, 0xk__
movd        DWORD PTR [ecx + 8*2], mm5
movq        mm6, mm2                ;[x5a':x0a']
punpckldq   mm2, mm7                ;[x0b':x0a']
punpckhdq   mm6, mm7                ;[x5b':x5a']
movq        mm5, mm2
movd        DWORD PTR [ecx + 48*2], mm3
pfadd       mm2, mm4                ;[x0b'+x4b':x0a'+x4a'] =
[FB17 FB16]
```

```
                                                -continued
    pfsub       mm5, mm4                    ;[x0b'-x4b':x0a'-x4a'] =
    [FB41:FB40]
    pf2iw       mm2, mm2
    movq        mm3, tmpQWord               ;[x1a':x6a']
    pf2iw       mm5, mm5
    pshufw      mm2, mm2, 0xB8
    pshufw      mm5, mm5, 0xB8
    movd        DWORD PTR [ecx + 16'2], mm2
    movq        mm4, mm3
    punpckldq   mm3, mm0                    ;[x6b':x6a']
    punpckhdq   mm4, mm0                    ;[x1b':x1a']
    movq        mm7, mm6
    movd        DWORD PTR [ecx + 40*2], mm5
    pfadd       mm6, mm3                    ;[x5b'+x6b':x5a'+x6a'] = [FB25:FB24]
    pfsub       mm7, mm3                    ;[x5b'-x6b':x5a'-x6a'] = [FB33:FB32]
    pf2iw       mm6, mm6
    pf2iw       mm7, mm7
    pshufw      mm6, mm6, 0xD8
    pshufw      mm7, mm7, 0xD8
    movd        DWORD PTR [ecx + 24*2], mm6
    movq        mm3, mm1                    ;[x7b':x7a']
    pfadd       mm1, mm4                    ;[x7b'+x1b':x7a'+x1a'] = [FB1:FB0]
    pfsub       mm3, mm4                    ;[x7b'-x1b':x7a'-x1a'] = [FB57:FB56]
    movd        DWORD PTR [ecx + 32*2], mm7
    pf2iw       mm1, mm1
    pf2iw       mm3, mm3
    pshufw      mm1, mm1, 0xD8
    pshufw      mm3, mm3, 0xD8
    movd        DWORD PTR [ecx], mm1
    add         ecx, 4
    add         edx, 8
    movd        DWORD PTR [ecx + 56*2 - 4], mm3
    dec         eax
    jnz         __idct__vloop__3dn
#endif                                      // end 3rd version of vertical idct
__end__idct__3dn:
    mov         eax, 0
    femms
    }                                       //end of assembly code
    return 0;
}                                           //end of IDCT__3dn( )
#endif
```

What is claimed is:

1. A method of performing a two-dimensional discrete cosine transform (DCT) using a microprocessor having an instruction set that includes single-instruction multiple-data (SIMD) floating point instructions, wherein the method comprises:

receiving a two-dimensional block of integer data having C columns and R rows, wherein each of the R rows contains a set of C row data values, wherein the block of integer data is indicative of a portion of an image, wherein each of C and R is an even integer; and for each row, loading the entire set of C row data values of the row into a set of C/2 registers of the microprocessor;

converting the C row data values into floating point form, wherein each of the registers holds two of the floating point row data values, wherein said converting is accomplished using a packed integer word to floating-point conversion (pi2fw) instruction; and performing a plurality of weighted-rotation operations on the values in the registers, wherein the weighted-rotation operations are performed using SIMD floating point instructions;

altering the arrangement of values in the registers;

performing a second plurality of weighted-rotation operations on the values in the registers;

again altering the arrangement of the values in the registers;

performing a third plurality of weighted-rotation operations on the values in the registers;

yet again altering the arrangement of the values in the registers;

performing a fourth plurality of weighted-rotation operations on the values in the registers to obtain C intermediate floating point values; and storing the C intermediate floating point values into a next available row of an intermediate buffer.

2. The method of claim 1, wherein said weighted-rotation operations are accomplished using a packed swap doubleword (pswapd) instruction, a packed floating-point multiplication (pfmul) instruction and a packed floating-point negative accumulate (pfpnacc) instruction.

3. The method of claim 1, further comprising:

for two columns of the intermediate buffer at a time:

loading data from the two columns into a plurality of registers of the microprocessor so that each of the registers holds one value from a first of the two columns and one value from a second of the two columns, wherein the one value from the first of the two columns and the one value from the second of the two columns are taken from the same row of the intermediate buffer; and performing a plurality of weighted-rotation operations on the values in the registers, wherein the weighted-rotation operations for two columns are performed in parallel using SIMD floating point instructions.

4. The method of claim 3, wherein said weighted-rotation operations for two columns at a time are accomplished using a packed floating-point multiplication (pfmul) instruction, a packed floating-point subtraction (pfsub) instruction and a packed floating-point addition (pfadd) instruction.

5. The method of claim 3, further comprising:
for two columns at a time,
as each weighted-rotation operation is done, storing weighted-rotation operation results to the intermediate buffer.

6. The method of claim 5, further comprising:
for two columns at a time,
retrieving weighted-rotation operation results from the intermediate buffer;
performing a second plurality of weighted-rotation operations on the retrieved values;
again storing weighted-rotation operation results to the intermediate buffer as the weighted-rotation operations of the second plurality are done;
again retrieving weighted-rotation operation results from the intermediate buffer;
performing a third plurality of weighted-rotation operations on the retrieved values;
yet again storing weighted-rotation operation results to the intermediate buffer as the weighted-rotation operations of the third plurality are done;
yet again retrieving weighted-rotation operation results from the intermediate buffer;
performing a fourth plurality of weighted-rotation operations on the retrieved values;
converting the weighted-rotation operation results from the fourth plurality to integer results.

7. The method of claim 3, further comprising:
for two columns at a time, writing the integer results to an output buffer.

8. The method of claim 1, wherein C=8 and R=8.

9. The method of claim 1, wherein each of the weighted rotations of said plurality, said second plurality, said third plurality and said fourth plurality have a computational form given by the expressions:

$$Y0=A*X0+B*X1,$$

$$Y1=-B*X0+A*X1,$$

wherein A and B are coefficients, X0 and X1 are inputs to the weighted rotation, Y0 and Y1 are results of the weighted rotation.

10. A method of performing a discrete cosine transform (DCT) using a microprocessor having an instruction set that includes single-instruction multiple-data (SIMD) floating point instructions, wherein the method comprises:
receiving a two-dimensional block of integer data having C columns and R rows, wherein each of C and R is an even integer, wherein the two-dimensional block represents a portion of an image; and
for two columns at a time,
loading column data from the two columns into registers of the microprocessor so that each of the registers holds one value from a first of the two columns and one value from a second of the two columns, wherein the one value from the first of the two columns and the one value from the second of the two columns are taken from the same row of the two-dimensional block;
converting the column data into floating point form; and
performing a plurality of weighted-rotation operations on the values in the registers, wherein the weighted-rotation operations for the two columns are performed in parallel using SIMD floating point instructions, wherein said weighted-rotation operations are accomplished using a packed floating-point multiplication (pfmul) instruction, a packed floating-point subtraction (pfsub) instruction and a packed floating-point addition (pfadd) instruction;
as each weighted-rotation operation is done, storing weighted-rotation operation results to an intermediate buffer.

11. The method of claim 10, further comprising:
for two columns at a time,
retrieving weighted-rotation operation results from the intermediate buffer;
performing a second plurality of weighted-rotation operations on the retrieved values;
again storing weighted-rotation operation results to the intermediate buffer as the weighted-rotation operations of the second plurality are done;
again retrieving weighted-rotation operation results from the intermediate buffer;
performing a third plurality of weighted-rotation operations on the retrieved values;
yet again storing weighted-rotation operation results to the intermediate buffer as the weighted-rotation operations of the third plurality are done;
yet again retrieving weighted-rotation operation results from the intermediate buffer;
performing a fourth plurality of weighted-rotation operations on the retrieved values;
converting the weighted-rotation operation results from the fourth plurality to integer results.

12. The method of claim 11, further comprising:
for two columns at a time, writing the integer results to an output buffer.

13. A computer system comprising:
a processor having an instruction set that includes single-instruction multiple-data (SIMD) floating point instructions; and
a memory coupled to the processor, wherein the memory stores software instructions executable by the processor to implement a two-dimensional discrete cosine transform method, the method comprising: receiving a two-dimensional block of integer data having C columns and R rows, wherein each of the R rows contains a set of C row data values, wherein the block of integer data is indicative of a portion of an image, wherein each of C and R is an even integer; and
for each row,
loading the entire set of C row data values of the row into a set of C/2 registers of the processor;
converting the C row data values into floating point form, wherein each of the registers holds two of the floating point row data values, wherein said converting is accomplished using a packed integer word to floating-point conversion (pi2fw) instruction; and
performing a plurality of weighted-rotation operations on the values in the registers, wherein the weighted-rotation operations are performed using SIMD floating point instructions;
altering the arrangement of values in the registers;
performing a second plurality of weighted-rotation operations on the values in the registers;
again altering the arrangement of the values in the registers;

performing a third plurality of weighted-rotation operations on the values in the registers;

yet again altering the arrangement of the values in the registers;

performing a fourth plurality of weighted-rotation operations on the values in the registers to obtain C intermediate floating point values; and storing the C intermediate floating point values into a next available row of an intermediate buffer.

14. A storage medium comprising software instructions executable by a microprocessor having an instruction set that includes single-instruction multiple-data (SIMD) floating point instructions to implement a method of performing a two-dimensional discrete cosine transform (DCT), wherein the method comprises: receiving a two-dimensional block of integer data having C columns and R rows, wherein each of the R rows contains a set of C row data values, wherein the block of integer data is indicative of a portion of an image, wherein each of C and R is an even integer, and for each row, loading the entire set of C row data values registers of the microprocessor; of the row into a set of C/2 converting the C row data values into floating point form, wherein each of the registers holds two of the floating point row data values, wherein said converting is accomplished using a packed integer word to floating-point conversion (pi2fw) instruction; and performing a plurality of weighted-rotation operations on the values in the registers, wherein the weighted-rotation operations are performed using SIMD floating point instructions; altering the arrangement of values in the registers; performing a second plurality of weighted-rotation operations on the values in the registers; again altering the arrangement of the values in the registers; performing a third plurality of weighted-rotation operations on the values in the registers; yet again altering the arrangement of the values in the registers; and performing a fourth plurality of weighted-rotation operations on the values in the registers to obtain C intermediate floating point values; and storing the C intermediate floating point values into a next available row of an intermediate buffer.

15. A computer system comprising:

a processor having an instruction set that includes single-instruction multiple-data (SIMD) floating point instructions; and a memory coupled to the processor, wherein the memory stores software instructions executable by the processor to implement the method of receiving a two-dimensional block of integer data having C columns and R rows, wherein the two-dimensional block of integer data is indicative of a portion of an image; and for two columns at a time, loading column data from the two columns into registers of the processor so that each of the registers holds one value from a first of the two columns and one value from a second of the two columns, wherein the one value from the first of the two columns and the one value from the second of the two columns are taken from the same row of the two-dimensional block;

converting the column data into floating point form; and performing a plurality of weighted-rotation operations on the values in the registers, wherein the weighted-rotation operations for the two columns are performed in parallel using SIMD floating point instructions, wherein said weighted-rotation operations are accomplished using a packed floating-point multiplication (pfmul) instruction, a packed floating-point subtraction (pfsub) instruction and a packed floating-point addition (pfadd) instruction;

as each weighted-rotation operation is done, storing weighted-rotation operation results to an intermediate buffer.

16. A storage medium comprising software instructions executable by a microprocessor having an instruction set that includes single-instruction multiple-data (SIMD) floating point instructions to implement a method of performing a discrete cosine transform (DCT), wherein the method comprises: receiving a two-dimensional block of integer data having C columns and R rows, wherein the two-dimensional block represents a portion of an image; and for two columns at a time, loading column data from the two columns into registers of the microprocessor so that each of the registers holds one value from a first of the two columns and one value from a second of the two columns, wherein the one value from the first of the two columns and the one value from the second of the two columns are taken from the same row of the two-dimensional block; converting the column data into floating point form; and performing a plurality of weighted-rotation operations on the values in the registers, wherein the weighted-rotation operations for the two columns are performed in parallel using SIMD floating point instructions, wherein said weighted-rotation operations are accomplished using a packed floating-point multiplication (pfmul) instruction, a packed floating-point subtraction (pfsub) instruction and a packed floating-point addition (pfadd) instruction; as each weighted-rotation operation is done, storing weighted-rotation operation results to an intermediate buffer.

* * * * *